Oct. 8, 1929.　　　J. Q. SHERMAN　　　1,731,180
PROTECTED RECORD FILE
Filed Feb. 26, 1925　　3 Sheets-Sheet 1
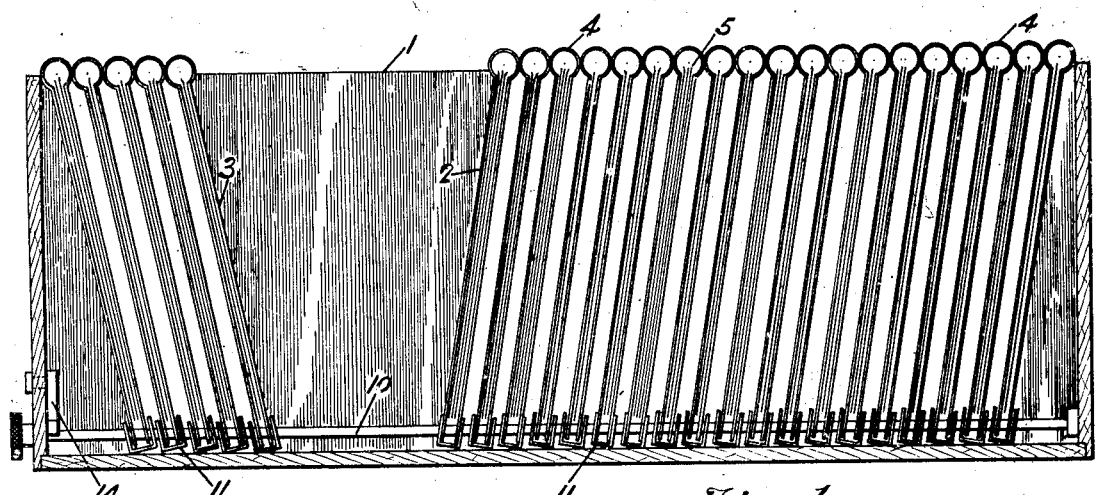
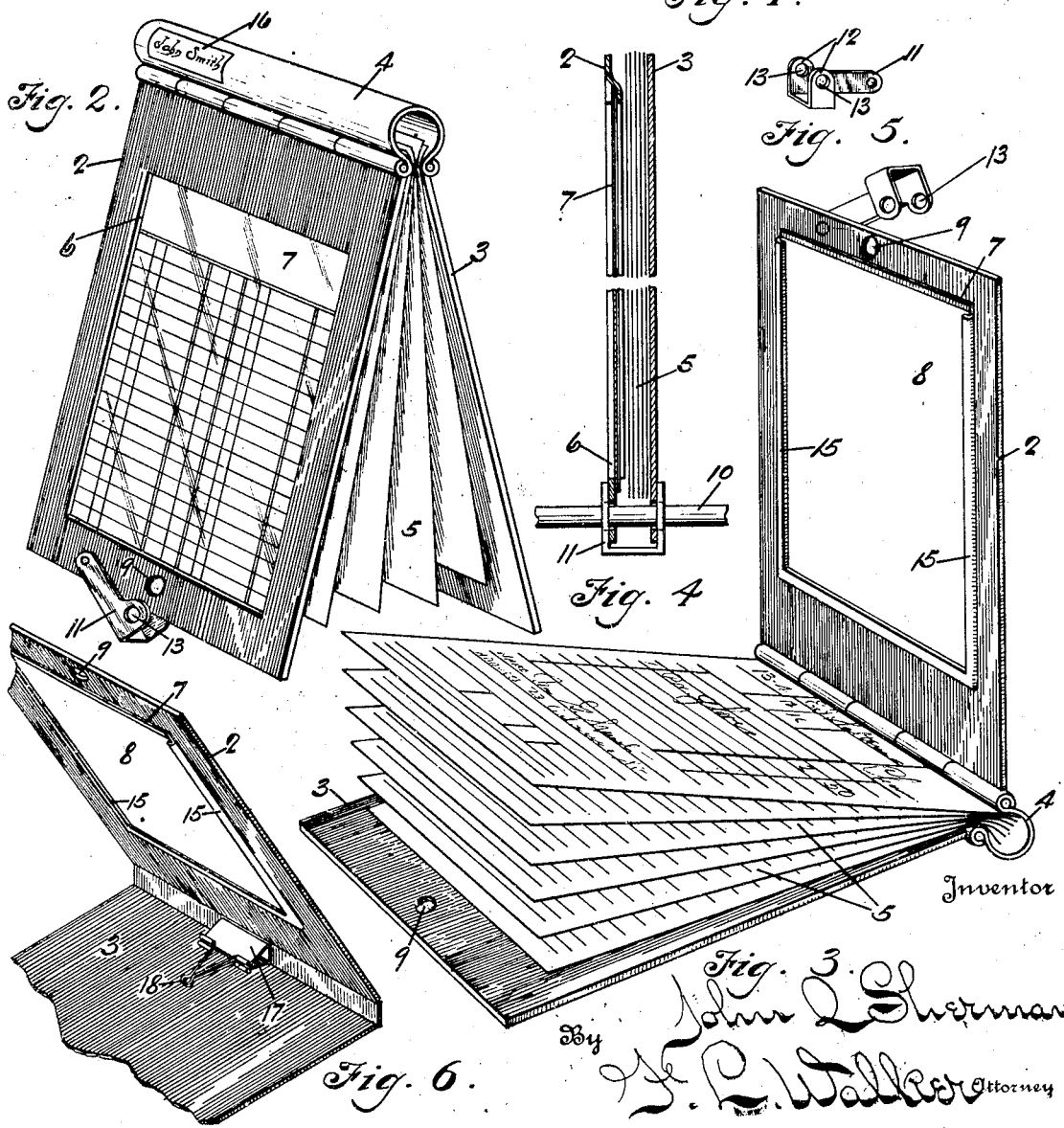

Oct. 8, 1929.  J. Q. SHERMAN  1,731,180
PROTECTED RECORD FILE
Filed Feb. 26, 1925   3 Sheets-Sheet 2
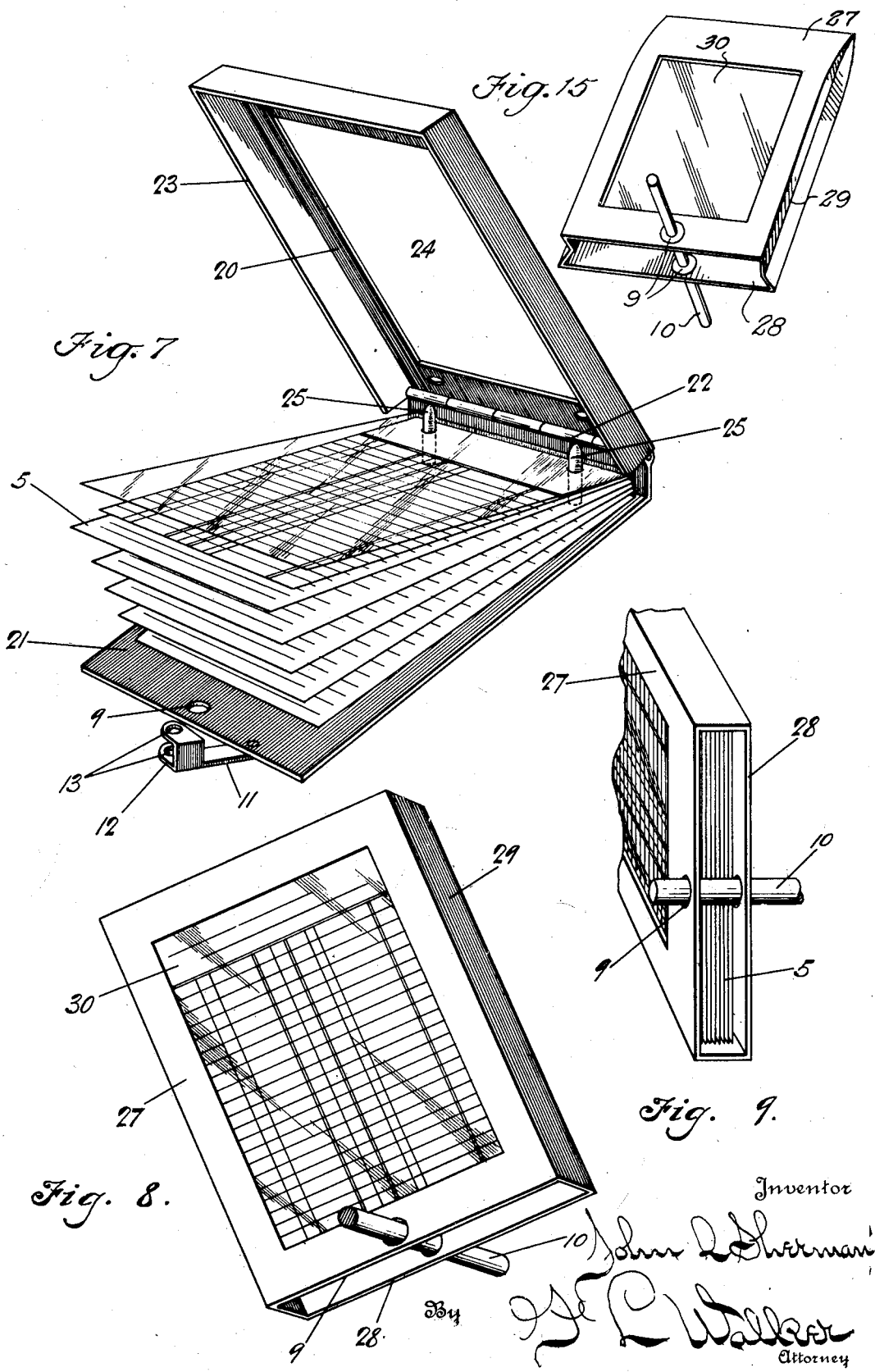

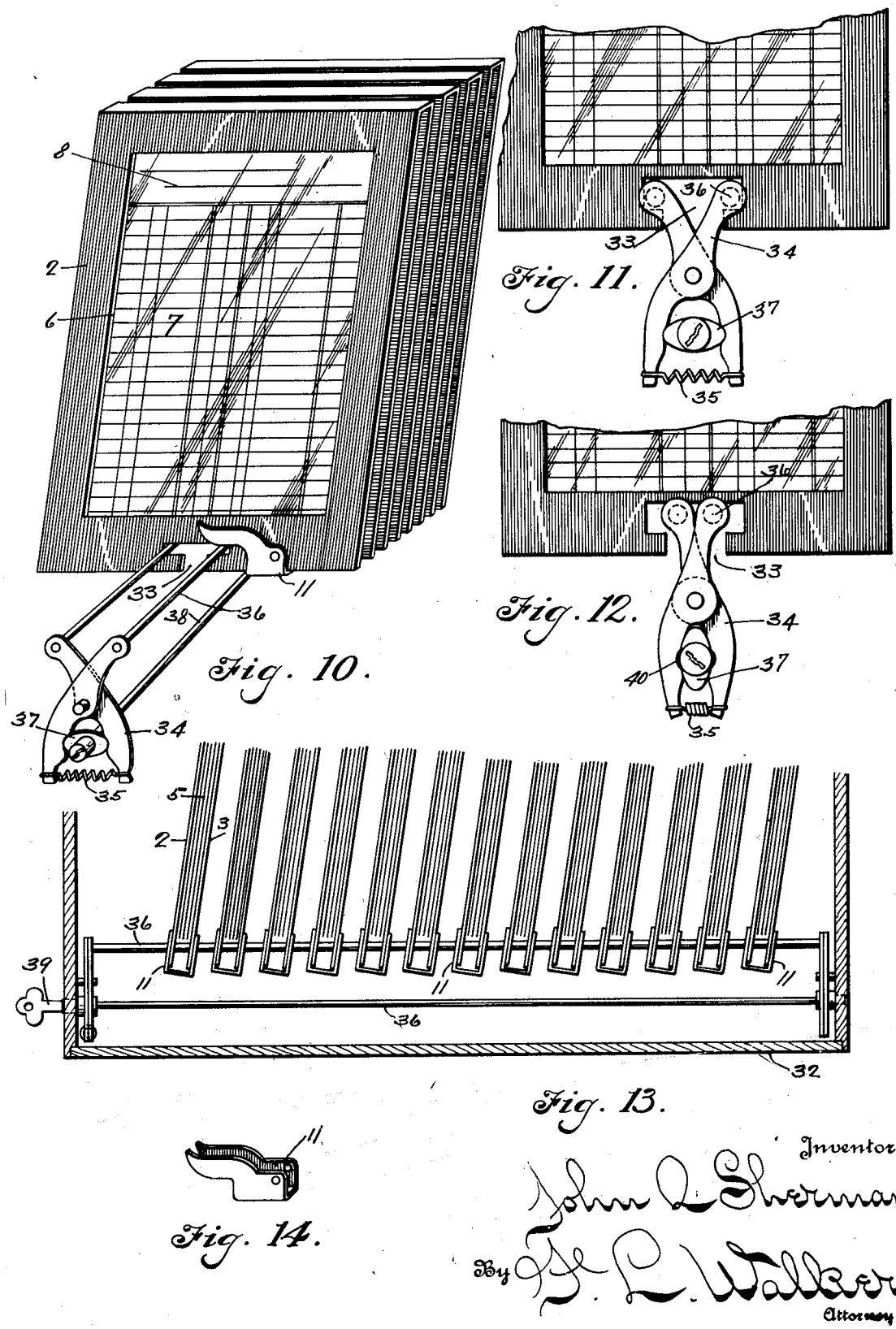

Patented Oct. 8, 1929

1,731,180

UNITED STATES PATENT OFFICE

JOHN Q. SHERMAN, OF DAYTON, OHIO

PROTECTED RECORD FILE

Application filed February 26, 1925. Serial No. 11,758.

My invention relates to files for loose memoranda, sales slips, account records and the like, wherein such filed data sheets will be protected against unauthorized removal or mutilation, and wherein the summary of each account, digest of the file contents or tabulation of data is at all times easily and readily accessible.

While the file herein described is particularly applicable to retail mercantile business for containing and protecting the ledger accounts of customers, the filing device is also applicable to other lines of accounting, as for instance, a physician's accounting system, or for filing and keeping detailed record of stock requisitions in a factory, signature cards in a bank, bank records of deposit or as a file of classified general information.

In the present invention there is contemplated a collection of file units, or containers for sales slips, data sheets, memoranda leaves or the like, preferably though not necessarily provided with binder posts, spring clips or other means for detachably engaging and retaining a collection of loose sheets or slips therein.

Each unit or container is formed with an observation space or window through which may be observed the topmost data sheet or record page which in the case of sales slips would be the last sales record bearing the total of the account to date, it being understood that the usual practice is to carry forward the grand total from one sales slip to another. In lieu of the last sales slip or final record sheet being exposed through the observation space, a ledger card or summary sheet, or index record of the contents of the unit may be exposed to view through such unit may be exposed to view through such observation space or window. In either instance the exposed record is protected by an overlying transparent cover sheet which prevents the removal of the sales slip, ledger card or summary sheet and prevents the changing of entries thereon.

The collection of file units or sales slip holders is preferably tho not necessarily arranged in a file box or receptacle for to and fro oscillatory movement by which the ledger card or record sheet or sales total of any selected unit or holder may be exposed to view thru its transparent cover. The file units or slip hoders are held against removal from prearranged series, while permitting such oscillatory movement by a locking rod, which engages the covers of successive slip holders or file units and is locked in position in the box or receptacle. When so positioned and held within a receptacle, the side walls of the latter form closures for the intervening space between the front and back covers of the several units or holders, thereby preventing unauthorized access to the data sheets or sales slips contained therein. In lieu of utilizing the wall of the receptacle to close the units, each unit may be provided with side flanges or the unit or holder may be of box form, thereby forming a complete closure within itself.

The object of the invention is to simplify the structure as well as the means and mode of operation of protected account files and the like, whereby they will not only be cheapened in construction, but will be more efficient in use, capable of being easily and quickly manipulated to disclose the summary of any desired account or filed record sheet, yet affording protection against the removal or alteration of such record sheet and to afford ample protection for the memoranda or data from which the ledger card or record sheet is compiled.

With the above primary and other incidental objects in view as will more fully appear in the specification, the invention consists of the features of construction, the parts and combinations thereof, and the mode of operation or their equivalents as hereinafter described and set forth in the claims.

In the accompanying drawing, Fig. 1 is a longitudinal sectional view of a file box or receptacle containing a number of file uits or slip holders of the type herein described. Fig. 2 is a perspective view of a spring back type of slip holder or file unit removed from the receptacle. Fig. 3 is a perspective view of the file unit or strip holder opened to expose to view the filed sales or memoranda slips contained therein. Fig. 4 is a detailed sectional view illustrating the locking engagement of the retaining rod and closure clip for the holder. Fig. 5 is a detail perspective view of a clamp or clip for retaining the holder in closed condition. Fig. 6 is an interior perspective view of a file unit or holder of modified form, embodying a conventional form of spring clip for holding the sales slips. Fig. 7 is a perspective view of a unit or holder wherein the slips and ledger card are loosely held on posts or studs. Figs. 8 and 9 are perspective views illustrating a box type of unit or holder. Fig. 10 is a perspective view illustrating a modified form of retaining and locking means. Figs. 11 and 12 are detail views showing the units locked and unlocked respectively. Fig. 13 is a side elevation of a collection of units engaged with the retaining frame. Fig. 14 is a detail of the clasp.

Fig. 15 is a perspective view of a simple form of envelope employed as the slip holder or unit.

Like parts are indicated by similar characters of reference throughout the several views.

The present invention utilizes in combination, certain features which have heretofore been employed separately, but which are here combined and rearranged in such relationship to co-operate with each other and to afford protection against the removal or mutilation of filed matter. The file unit or holder herein described may be a conventional form of loose leaf binder or either spring back or stud post type, such as is frequently used by deliverymen and by shippers for holding bills of lading, invoices and the like. These binders, however, are ordinarily used singly and the contents are entirely without protection, being always accessible for removal or for change and falsification of entries. It has been more or less the common practice to lock a series of index cards in a box or receptacle by transfixing them upon a retaining rod. Such cards are always accessible, however, for mutilation or for change of entries. The mere locking of independent cards against removal does not prevent falsification of the records on such cards, or the mutilation of such cards which may be torn from the locking rod, without leaving trace of such removal. In the present instance, known features have been combined and reconstructed into a protected file affording security to the filed matter and in their new relationship supplying a need which was not met by the features of the present file when separately employed.

In constructing the present embodiment of a protected file, there is employed a box or receptacle 1, to receive a plurality of file units or holders for independent sales slips, memoranda sheets, data leaves or the like. Each of the file units or holders illustrated in Figs. 1 to 3 is in the form of a spring back loose leaf binder, comprising front and rear covers 2 and 3, hinged to an intermediate spring back portion 4. The covers 2 and 3 are preferably of sheet metal, such as aluminum, but may be of tag board, book-binder's board or even of a heavy grade of manila board or paper. The spring back 4 as usually employed is of tubular form, longitudinally slotted, with a tendency to contract and thereby clamp within the longitudinal slot of such tubular spring back 4, any sheet or memoranda slip which may have been inserted therein. The covers 2 and 3 are hinged to this spring back or clamp portion 4. The usual mode of operation is to turn one of the covers backward to a wide open position and employ the leverage of such cover to pry open the back clip 4 against its inherent tension to enable the insertion and removal of sales slips or memoranda sheets. The front cover 2 of this file unit or holder is provided with a window opening 6, having a transparent closure sheet 7 of celluloid, mica, glass, pyraline or similar material. Positioned behind the transparent panel 7 of the cover 2 is a ledger card 8. In lieu of the ledger card 8, there may be substituted a summary card or index pertaining to the contents of the file unit or holder. The free ends of the cover portions 2 and 3 extend somewhat beyond the extremities of the inserted sales slips or memoranda sheets 5, and are apertured, the apertures in the respective cover portions 2 and 3 registering with each other to enable the engagement therein of one or more retaining rods common to the series of units. To hold the file unit or holder in closed position and prevent the cover portion being separated by slidingly adjusting them upon the retaining rods, a clasp fastener 11 is pivoted to one of the covers and is provided with spaced perforated ears 12, which straddle the free ends of the cover portions 2 and 3 when the unit or holder is closed, with the perforations 13 of such ears registering with the holes in the cover of the unit. In a simple but efficient form, the retaining means may comprise a longitudinally removable rod 10 transfixing the units or holders which are preforated at 9 receive the rod. The retaining rod not only extends through the perforations of the covers, but also through the perforations 13 of the clasp fastener when the latter is in its closed condition. The holes in the unit covers 2 and 3, as well as the holes 13 in the clasp fastener, are sufficiently large to afford the necessary clearance to enable a reasonable range of oscillatory movement of the units or holders in a fore and aft direction within the box or receptacle 1. The retaining rod 10 is locked within the receptacle 1, and in its transfixing relation with the units or holders by means of a key lock 14, of any suitable construction or design.

While the use of the rod 10 extending through the perforations 9 of the units affords an effective and cheap retaining means, a preferable construction is shown in Figs. 10 to 13. In this form of retainer the disadvantage of having to withdraw the rod 10 to release a desired unit is overcome by providing a collapsible frame which when contracted permits any unit to be easily removed from the series. In Fig. 10 which is a side elevation, 32 indicates the mounting which may be a receptacle or drawer, or a base upon which the series of units are arranged in series. Each of the units is provided with inwardly enlarged apertures 33 in the lower margins. The apertures have been shown as substantially T shaped, having a narrow entrance mouth beyond which the apertures are laterally enlarged. Located to the front and rear of the series of units are a pair of inter-pivoted oscillatory arms 34. The lower ends of the arms of each pair are interconnected by a spring 35 which tends to oscillate the pivoted arms toward parallelism, like a pair of tongs. The corresponding arms 34 of each pair are interconnected by longitudinal rods 36 which are moved toward and from each other by the oscillation of the arms, thereby forming a collapsible frame. When the retaining frame is in contracted or collapsed condition as shown in Fig. 12, the rods 36 being closely positioned to each other readily enter the contracted mouth of the aperture 33 as the units are rested upon the retaining frame. Upon expansion of the retaining frame by outward oscillation of the inter-pivoted arms 34, the rods 36 are separated and enter into the lateral enlargement of the apertures 33. Being in overhanging relation with the inward projecting portions of the units and out of registry with the restricted mouth of the aperture, the units can not be disengaged until the retaining frame is again collapsed. To expand the frame against the tension of the spring 35, elliptical cam heads 37 are provided between the pivoted arms 34. These cam heads 37 are interconnected to rotate in unison by a shaft or rod 38. The heads are rotated by a key 39. Then in transverse position in which they distend the tong like arms 34, they engage in shallow depressions 40 to retain their adjusted positions until disengaged by means of the key.

Obviously one of the arms 34 of each pair and one of the rods 36 might be omitted, and the units retained by the movement of one rod only into the lateral portion of the apertures.

A clasp fastener 11 is employed, the free end of which overhangs the retaining rod 36 to prevent its disengagement. Such free end is preferably tapered or cam shaped enabling the rod 36 to complete the closing movement of the clasp if the latter is only partially oscillated.

In the event of filing retail sales slips and the like, or other memoranda in which a summary or grand total is carried forward from one slip to another, no ledger card or other cumulative summary is needed. The last sales slip of the number filed being visible thru the transparent protective cover, the clerk may ascertain therefrom the amount due to be entered upon a succeeding slip, or to receive payment therefor as the case may be. To meet other conditions of use a ledger card or summary to which items are transferred from the filed slips or sheets may be desirable. In such case the summary or ledger card is preferably though not necessarily engaged in the unit independently of the slips, altho they may be engaged by the same spring clip or binding posts with the memoranda slips as shown in Fig. 7.

The transparent protective panel 7 and the ledger card 8 or the summary or index card which may be substituted therefor, may be retained within guides or overhanging flanges 15, surrounding the observation openings 6 of the unit cover. These overhanging guide flanges 15 enclose three sides of the ledger card and protective transparent overlying sheet. Such guide flanges are open adjacent to the free end of the cover 2 to permit the withdrawal of the ledger card for further entries. However, the locking rod extends in such close proximity to the free margins of the ledger card and overlying protective transparent cover that such cards are immovably held within the guide flanges 15 when the holder or unit is secured within the receptacle 1. In lieu of mounting the ledger or summary card and transparent overlying protective cover in the guide flanges 15, these may be placed on top of the collection of sales slips and engaged therewith within the spring back 4, or the clip 17 (Fig. 6).

While the form of loose leaf binder employing the tubular spring back 4 affords a convenient file unit or holder, the invention is not limited to this particular construction, but contemplates any means for detachably holding separate sales slips intermediate a pair of covers, which are secured in prearranged order or series against removal, but which are permitted to and fro movement to expose to view the faces of such holders or units. As a modification there is shown in Fig. 6 a unit or holder, wherein the front and rear covers 2' and 3' are formed from a continuous strip of material such as tag board folded upon itself to parallelism. Within the fold of such modified unit or cover there is secured the conventional form of spring stationery clip 17, which serves to clamp and detachably hold the sales slips or memorandum sheets, which may be filed intermediate the covers 2' and 3'. This spring clip 17 comprises a small portion of spring metal bent upon itself to afford clamp jaws, between which the sales slips or memoranda sheets are clamped. The jaws are opened by small wire arms 18, hinged to the margins of the jaws, which are bent backward and their leverage utilized for separating the spring jaws to permit insertion of the slips. This spring clip per se is a staple article of commerce at the present time.

In lieu of the spring back binder, or the spring clip heretofore described for holding the sales slips, such sales slip and the ledger card or summary sheet and transparent protective cover sheet as well, may be loosely retained within the units or holders. Such sales slip and summary card together with the overlying transparent protective cover, may be provided with perforations for engagement over studs or posts, within the file unit or holder or such card inserts may be loosely held within the file unit which being provided with side walls or flanges is complete within itself, and non-dependent upon the box or receptacle.

In Fig. 7 there is shown a construction wherein the front and back covers 20 and 21 are hinged one to the other, at 22. Either of these cover sections may be provided with marginal flanges 23, which in the present instance are shown on the front cover portion 20. This cover portion 20 is provided with an observation opening or window 24. The back cover 21 is provided with standing studs or posts 25, which for economy of manufacture may comprise tongues of material struck up from the back cover section 21. In the present instance, not only are the sales slips or memoranda sheets 5 engaged over the standing studs or posts 25, but the ledger card and transparent protective cover are also in like manner engaged upon the studs or posts 25 on top of the collection of sales slips 5, so that when the unit is closed, the ledger cards or summary sheet and protective transparent covers are intermediate the collection of sales slips and the front cover 20 and observable thru the window opening 24. These units or holders when closed are retained in prearranged succession or series by the retaining rod 10, which extends thru the holes 9 of successive units or holders. Each holder in itself being complete in itself and being closed by the marginal flanges 23, it is not necessary that they be secured within a box or receptacle, but may be housed in any suitable rack or merely retained in series upon the retaining rod 10. In lieu of the hinged holder or binder as heretofore described, there may be employed envelopes or box-like file units or holders as shown in Figs. 8 and 9. These units have their front and rear cover portions 27 and 28 permanently interconnected by a marginal wall 29. Each unit or holder is provided with an observation window 30, in the front wall 27. The units are accessible thru an open end 31, thru which not only the sales slips but also the ledger cards or summary sheet and transparent protective sheet are insertable. These sheets are loosely slipped into the unit or holder with the transparent protective sheet and summary card adjacent the window opening 30, and the sales slips immediately behind the ledger card or summary sheet. Such sheets and cards are held against removal by the retaining rod 10, extending thru the holes 9 in the front and rear walls of the unit and thence transversely across the open end.

The locked rod 10 retains the unit shown in Figs. 7 and 8 in prearranged series or order, in which, however, they are capable of to and fro oscillatory movement, permitted by making the holes 9 sufficiently larger than the diameter of the rod 10 to permit the necessary clearance.

In using this protected file in an ordinary mercantile business, a file unit or holder is provided for each credit customer whose name is entered on the top of the holder or unit as at 16, in Fig. 2. The holders or units are free for limited sliding movement to and fro upon the retaining rod 10 as well as for oscillatory movement in a fore and aft direction by which the series of holders or units may be separated at any desired point to expose to view thru the transparent overlying protective sheet, the ledger card showing the condition of the account of any particular customer. Thus the account of the customer is readily accessible to the clerk for the ascertainment of the total amount due, the dates of purchases and payments, but is not accessible for removal of the ledger card, nor for change or falsification of the entry. During the progress of the day's business, sales slips or memoranda sheets as the case may be are deposited between the succeeding units or holders of the file, preferably immediately in advance of the customers' accounts to which they pertain. At the close of business the proprietor or accountant releases the file unit or holders by unlocking the retaining rod by means of the lock 14, and removes the unit. He then withdraws the ledger card and enters thereon the total of the day's business as indicated by sales slips or memoranda sheets pertaining to such accounts, and secures within the file unit or holder, the sales slips or memoranda sheets upon which the charges and entries are based. Upon returning the holders to the receptacle and locking them by locking the retaining rod, the sales slips are secured against removal by a dishonest clerk, or by a dishonest customer who might surreptitiously remove some of the sales slips. The clerk or attendant is thus able to file current memoranda or sales slips, intermediate the file units or holders and to ascertain the condition of any account or recorded summary from the ledger sheet, or visible sales slip, but he cannot remove such card or change the entries thereon, nor remove or mutilate the previously transferred memoranda or sales slips contained in the normally inaccessible file unit or holder, upon which the summarized record is based.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect, and the invention is, therefore, claimed in any of its forms or modifications within the legitimate and valid scope of the appended claims.

Having thus described my invention, I claim:

1. In a protected file for accounts and the like, a plurality of holders, each comprising a pair of covers between which file slips are to be deposited, spring clip means intermediate the covers for detachably engaging the deposited slips, one of said covers being apertured to expose to view a slip deposited therein, a receptacle for a plurality of such holders, the holders being accessible for deposit or removal of slips only upon removal from the receptacle, and means for retaining the holders within the receptacle while permitting to and fro oscillatory movement of said holders.

2. In a protected file for accounts and the like, a plurality of loose leaf binders arranged in series and open at their bottom margins for the insertion and removal of leaves, means for locking the binders against opening and also against removal from the series while permitting to and fro oscillatory movement of the binders.

3. In a protected file for accounts and the like, a plurality of loose leaf binders, each comprising a pair of covers and means for detachably engaging a plurality of loose sheets in book style between the covers, means common to a plurality of binders for locking the covers against opening, and means for retaining the binders in prearranged series while permitting to and fro movement thereof.

4. In a protected file for accounts and the like, a plurality of spring back loose leaf binders in prearranged series, the individual binders of the series being accessible for observation but not for insertion or removal of sheets, each comprising a pair of covers, a spring back section interconnecting the covers and adapted to clamp a collection of loose sheets, means for locking the covers in closed relation and means for retaining the binders in prearranged series while permitting relative adjustment thereof for observation of selected binders of the series.

5. In a protected file for accounts and the like, a plurality of loose leaf binders each accessible for observation of individual binders, each comprising a pair of covers and means for securing a collection of loose sheets therebetween, means for securing the covers in closed relation, and means for preventing removal of the binders from their prearrangement in series while permitting relative adjustment thereof for observation of selected binders of the series.

6. In a protected file for accounts and the like, a plurality of loose leaf binders capable of detachably holding a collection of loose leaves, the binders being each accessible for observation thereof, a receptacle in which the binders are located in substantially upright positions with the binding portion uppermost, and the open ends of the binders within the receptacle, the walls of which prevent access to the contents of the binders without removal from the receptacle and means for preventing the removal of the binders from the receptacle while permitting to and fro movement thereof within the receptacle to enable observation of selected binders of the series.

7. In a protected file for accounts and the like, a plurality of loose leaf binders each capable of detachably holding a collection of loose leaves, each including an apertured cover and a locking rod common to a plurality of binders and engageable simultaneously in the cover apertures thereof for locking the binders to prevent access to the contents thereof, and an overlying card or the like in each binder containing a summary of the contents of the binder inaccessible but visible from the exterior of the binder.

8. In a file unit for accounts and the like, a loose leaf binder, comprising a pair of covers, means for detachably holding a collection of loose leaves intermediate the covers, a transparent window in one of the covers, a sheet containing a summary of the contents of the binder displayed thru the transparent window and a fastening device for said binder extending transversely across the binder from one cover to the other in the path of removal of the filed leaves and summary sheet from said binder, preventing access to the filed leaves or the summary sheet.

9. In a protected file for accounts and the like, a plurality of loose leaf binders, each comprising a pair of covers between which a collection of loose leaves is insertable, means for preventing the removal of the collection of loose leaves therefrom, and means common to the plurality of binders preventing the independent removal of said binders and for retaining the binders in prearranged series while permitting relative to and fro movement thereof.

10. In a protected file for accounts and the like, a plurality of loose leaf binders, each comprising a pair of covers, means for detachably securing a collection of loose leaves intermediate the covers, a bifurcated clasp pivoted to one of the covers and straddling the free ends of the covers when the binder is closed to retain the covers in closed relation, and means common to a plurality of binders normally extending into the path of swinging disengaging movement of the pivoted clasps to prevent the release of the covers and for retaining the binders in prearranged series while permitting to and fro relative movement thereof.

11. In a protected file for accounts and the like, a plurality of loose leaf binders, each comprising a pair of covers, means for detachably securing a collection of loose leaves therebetween, said covers being apertured adjacent their free ends and beyond the extremities of the leaves contained therebetween, and a retaining rod common to a number of binders extending thru registering apertures in the covers thereof, to prevent removal of the binders from prearranged series.

12. In a protected file for accounts and the like, a plurality of file units to receive sales slips and the like, a transparent window in each unit, a summary sheet pertaining to the contents of the unit visible through the transparent window, said summary sheet being removable from the unit, and a retaining rod common to a plurality of file units and extending through registering openings therein in the path of withdrawal of the summary sheets, preventing their removal while permitting their examination by relative to and fro movement of the units.

13. In a protected file for accounts and the like, a plurality of upright file units open at their bottom margins to receive loose sales slips and the like, a transparent window in each unit, a summary sheet pertaining to the contents of the unit slidingly mounted behind the transparent window of each unit and visible therethrough, and means extending transversely of the open bottom margins of the units for locking the summary sheets against removal while permitting their examination by the to and fro relative movement of the units.

14. In a protected file for accounts and the like, a plurality of file units each comprising a pair of covers arranged in substantially upright positions and hinged at their tops with the free end of the covers downturned, means for detachably securing a collection of loose leaves intermediate the covers, a receptacle within which the units are removably located, the sides and bottom of which form closures for the open margins of the file units, said units being accessible for insertion and removal of leaves by removal from the receptacle, a transparent window in each unit, a summary sheet visible through the transparent window of each unit, said units being capable of to and fro movement within the receptacle to expose the summary sheets of different units to view and means to prevent the removal of the units from the receptacle while permiting to and fro movement thereof.

15. In a protected file for accounts and the like, a plurality of loose leaf holders, each including a pair of covers, means for detachably securing a collection of loose leaves therebetween, and retaining means adapted to be locked in position common to a number of holders extending into the path of removal of the loose leaves from said holders and engageable with the covers thereof, adjacent the access opening of the holder to prevent the escape of the contents and removal of the holders from prearranged series.

16. In a protected file for accounts and the like, a plurality of enclosures within which file sheets are to be deposited, means within each enclosure for detachably engaging the deposited sheets, an observation opening in each enclosure, a transparent protective cover sheet overlying the contents of the holder through which the topmost sheet of such contents may be observed, a mounting for said plurality of enclosures, and means for detachably engaging the enclosures with the mounting while permitting relative movement thereof, to expose to view the overlying sheet of the contents of a selected enclosure.

17. In a protected file for accounts and the like, a plurality of loose leaf holders, means for locking said holders against removal of the contents, each holder having an observation spaced therein, a transparent protective cover sheet coincident with the observation space through which the overlying sheet of the contents of the holder may be observed, and means for detachably retaining the holders.

In testimony whereof, I have hereunto set my hand this 29th day of January, A. D. 1925.

JOHN Q. SHERMAN.